United States Patent
Ozaki et al.

(10) Patent No.: US 10,603,797 B2
(45) Date of Patent: Mar. 31, 2020

(54) MACHINE LEARNING DEVICE, ROBOT SYSTEM, AND MACHINE LEARNING METHOD FOR LEARNING MOTION OF ROBOT ENGAGED IN TASK PERFORMED BY HUMAN AND ROBOT IN COOPERATE WITH EACH OTHER

(71) Applicant: FANUC CORPORATION, Yamanashi (JP)

(72) Inventors: Shunichi Ozaki, Yamanashi (JP); Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 217 days.

(21) Appl. No.: 15/637,777

(22) Filed: Jun. 29, 2017

(65) Prior Publication Data

US 2018/0056520 A1 Mar. 1, 2018

(30) Foreign Application Priority Data

Aug. 23, 2016 (JP) ................................ 2016-162785

(51) Int. Cl.
*B25J 13/08* (2006.01)
*G06N 3/00* (2006.01)
(Continued)

(52) U.S. Cl.
CPC ........... *B25J 13/084* (2013.01); *B25J 9/0084* (2013.01); *B25J 9/163* (2013.01); *B25J 9/1653* (2013.01); *B25J 9/1676* (2013.01); *B25J 9/1694* (2013.01); *B25J 13/003* (2013.01); *B25J 13/085* (2013.01); *B25J 13/088* (2013.01); *B25J 19/023* (2013.01);
(Continued)

(58) Field of Classification Search
CPC ...... B25J 13/003; B25J 13/084; B25J 13/085; B25J 9/163; G05B 2219/40202; G05B 2219/40391; G05B 2219/40531; G06N 3/08
See application file for complete search history.

(56) References Cited

U.S. PATENT DOCUMENTS 6,353,814 B1 * 3/2002 Weng ................. G05B 13/0265
700/258
6,394,731 B1 * 5/2002 Konosu ...................... B25J 5/04
414/5

(Continued)

FOREIGN PATENT DOCUMENTS

| CN | 1396857 A | 2/2003 |
|---|---|---|
| CN | 1590039 A | 3/2005 |

(Continued)

*Primary Examiner* — Ryan Rink
(74) *Attorney, Agent, or Firm* — Hauptman Ham, LLP (57) ABSTRACT

A machine learning device for learning a motion of a robot engaged in a task performed by a human and a robot in cooperation with each other, including a state observation unit that observes a state variable indicating a state of the robot when the human and the robot cooperate with each other and perform a task; a reward calculation unit that calculates a reward based on control data and the state variable for controlling the robot and on an action of the human; and a value function update unit that updates an action value function for controlling a motion of the robot, based on the reward and the state variable.

12 Claims, 6 Drawing Sheets

(51) Int. Cl.
  *B25J 9/16* (2006.01)
  *B25J 13/00* (2006.01)
  *B25J 19/02* (2006.01)
  *G06N 3/08* (2006.01)
  *B25J 9/00* (2006.01)
  *B25J 19/06* (2006.01)

(52) U.S. Cl.
  CPC .............. *B25J 19/06* (2013.01); *G06N 3/008* (2013.01); *G06N 3/08* (2013.01); *G06N 3/084* (2013.01); *G05B 2219/40202* (2013.01); *G05B 2219/40391* (2013.01); *G05B 2219/40531* (2013.01)

(56) References Cited

U.S. PATENT DOCUMENTS

| | | | | |
|---|---|---|---|---|
| 6,452,348 | B1* | 9/2002 | Toyoda | B25J 13/003 318/3 |
| 6,522,952 | B1* | 2/2003 | Arai | B25J 9/1679 414/591 |
| 7,203,642 | B2* | 4/2007 | Ishii | A63H 11/00 446/297 |
| 2002/0103576 | A1* | 8/2002 | Takamura | A63H 11/00 700/245 |
| 2002/0158599 | A1* | 10/2002 | Fujita | B25J 13/003 318/568.11 |
| 2003/0074337 | A1* | 4/2003 | Sadakuni | F02B 33/04 706/11 |
| 2003/0182122 | A1* | 9/2003 | Horinaka | B25J 13/003 704/270 |
| 2004/0015265 | A1* | 1/2004 | Asano | B25J 13/003 700/245 |
| 2004/0210347 | A1* | 10/2004 | Sawada | G06N 3/008 700/246 |
| 2005/0021483 | A1* | 1/2005 | Kaplan | G06N 3/004 706/12 |
| 2005/0071048 | A1* | 3/2005 | Watanabe | B25J 9/1664 700/259 |
| 2005/0080513 | A1* | 4/2005 | Ito | G06N 3/08 700/245 |
| 2005/0113973 | A1 | 5/2005 | Endo et al. | |
| 2007/0282485 | A1* | 12/2007 | Nagatsuka | B25J 9/1671 700/245 |
| 2008/0208776 | A1* | 8/2008 | Lee | G06N 3/004 706/12 |
| 2010/0087955 | A1* | 4/2010 | Tsusaka | B25J 9/0003 700/245 |
| 2010/0092032 | A1* | 4/2010 | Boca | B25J 9/1679 382/103 |
| 2010/0114807 | A1* | 5/2010 | Ueda | G06N 20/00 706/25 |
| 2011/0015785 | A1* | 1/2011 | Tsusaka | B25J 9/0003 700/245 |
| 2012/0057761 | A1* | 3/2012 | Li | G06K 9/00342 382/107 |
| 2013/0218339 | A1* | 8/2013 | Maisonnier | B25J 11/0005 700/257 |
| 2013/0343640 | A1 | 12/2013 | Buehler et al. | |
| 2013/0345873 | A1* | 12/2013 | Blumberg | B25J 9/0087 700/259 |
| 2014/0371912 | A1* | 12/2014 | Passot | G06N 3/008 700/264 |
| 2015/0100530 | A1* | 4/2015 | Mnih | G06N 3/0454 706/25 |
| 2015/0174771 | A1* | 6/2015 | Fujita | B25J 19/06 700/258 |
| 2016/0008976 | A1* | 1/2016 | Nagatsuka | B25J 9/163 700/253 |
| 2016/0075018 | A1* | 3/2016 | Izhikevich | B25J 9/163 700/253 |
| 2016/0209817 | A1* | 7/2016 | Kameda | G05B 13/04 |
| 2018/0099408 | A1* | 4/2018 | Shibata | B25J 9/163 |
| 2018/0281180 | A1* | 10/2018 | Yamamoto | B25J 9/163 |

FOREIGN PATENT DOCUMENTS

| | | |
|---|---|---|
| CN | 102896630 A | 1/2013 |
| CN | 104379308 A | 2/2015 |
| CN | 104602868 A | 5/2015 |
| CN | 105773619 A | 7/2016 |
| JP | 5-318358 A | 12/1993 |
| JP | 10-146782 A | 6/1998 |
| JP | 2002-307349 A | 10/2002 |
| JP | 2005-118959 A | 5/2005 |
| JP | 2006-320997 | 11/2006 |
| JP | 2007-65929 A | 3/2007 |
| WO | 2012/010437 A1 | 1/2012 |

\* cited by examiner

MACHINE LEARNING DEVICE, ROBOT SYSTEM, AND MACHINE LEARNING METHOD FOR LEARNING MOTION OF ROBOT ENGAGED IN TASK PERFORMED BY HUMAN AND ROBOT IN COOPERATE WITH EACH OTHER

RELATED APPLICATIONS

The present application claims priority to Japanese Patent Application No. 2016-162785 filed Aug. 23, 2016, the disclosure of which is hereby incorporated by reference herein in its entirety.

BACKGROUND OF THE INVENTION

1. Field of the Invention

The present invention relates to a machine learning device, a robot system, and a machine learning method for learning a motion of a robot engaged in a task performed by a human and a robot in cooperation with each other.

2. Description of the Related Art

In conventional robot systems, safety measures were taken to prevent humans from entering the work area of a robot in order to ensure safety of humans. For example, safety fences were installed and humans were prohibited from entering inside the safety fences.

In recent years, robots engaged in a task performed by a human and a robot in cooperation with each other (cooperative robots) have been studied, developed and put into practical use. With such a robot (robot system), a robot and a human (worker) cooperate with each other to perform a task, for example, with no safety fence installed around the robot.

With regard to a conventional technique for teaching a robot a motion for performing a task by using a teaching pendant, there has been proposed a teaching technique for a robot, which has simplified the teaching operation for a robot and reduced the teaching time by introducing teaching operation based on a simple pressing or touching actions on the teaching pendant (e.g., Japanese Laid-Open Patent Publication No. H10(1998)-146782).

Also conventionally, with respect to an industrial robot for which teaching is conducted by inputting coordinate values of the route of its movement using a teaching pendant, there has been proposed an industrial robot provided with a start switch, a stop switch, numeric keys for inputting various instructions and values, a teaching mode key, a repetitive input key, and a display device, with which to input coordinate values for setting the route of the movement more easily and accurately (e.g., Japanese Laid-Open Patent Publication No. H05(1993)-318358).

In general, today's industrial robots are operated (driven) according to an operation program prepared in advance, or driven so that they may move along the taught points i.e. the points taught to the robots in advance by using teaching pendants and the like. Even with robot systems for a task performed by a human and a robot in cooperation with each other (cooperative robot systems), routes for the robots are set in advance and the robots are driven along the routes.

When a human and a robot cooperate with each other to perform a task, however, there may be more than one way to complete the task. For example, when a workpiece is to be conveyed from an initial position to a target position in a factory or the like where goods are manufactured and the human and the robot cooperate with each other to lift the workpiece and convey it to the target position, there is a wide choice in the direction, speed, and the like in lifting the workpiece.

The degree of burden on the human depends on how to control the motions of the robot relative to the workpiece. For example, the degree of fatigue of the human changes depending on the distance from the human and the speed even when the task performed is the same. In addition, the behavior pattern of a human may change depending on the content of the task. Hence, it is difficult to optimize the motions of the robot engaged in a task performed by a human and a robot in cooperation with each other, which is problematic.

One of the ways to address this problem is to make the robot to learn motions for a task performed in cooperation with a human by employing techniques of machine learning. However, even the motions of a robot acquired through application of machine learning may be preferably improved further by a human (for example, a worker).

In view of the problem of the conventional technique as described above, a main object of the present invention is to provide a machine learning device, a robot system, and a machine learning method that may further improve the motions of a robot engaged in a task performed by a human and a robot in cooperation with each other. Another object of the present invention is to provide a machine learning device, a robot system, and a machine learning method that enable the improvement of cooperative motions by utilizing various sensor information, through conversation with a human, and by other means when a human and a robot cooperate with each other and perform a task.

SUMMARY OF INVENTION

According to a first aspect of the present invention, there is provided a machine learning device for learning a motion of a robot engaged in a task performed by a human and a robot in cooperation with each other, including a state observation unit that observes a state variable indicating a state of the robot when the human and the robot cooperate with each other and perform a task; a reward calculation unit that calculates a reward based on control data and the state variable for controlling the robot and on an action of the human; and a value function update unit that updates an action value function for controlling a motion of the robot, based on the reward and the state variable.

The reward calculation unit may calculate the reward by adding a second reward based on the action of the human to a first reward based on the control data and the state variable. For the second reward, a positive reward may be set when the robot is stroked and a negative reward is set when the robot is hit, by a tactile sensor provided for the robot, or a positive reward may be set when the robot is praised and a negative reward is set when the robot is scolded, by a microphone provided on a part of or near the robot or worn by the human.

The machine learning device may further include a decision unit that determines a command data prescribing a motion of the robot, based on an output of the value function update unit. The state variable may include at least one of outputs of a camera, a force sensor, a microphone and a tactile sensor. The camera may be provided directly onto the robot or in a surrounding area such as an area above the robot, the force sensor may be provided in a position on at least one of a base part, or a hand part of the robot or a peripheral device, or the tactile sensor may be provided for at least a part of the robot or on a peripheral device.

According to a second aspect of the present invention, there is provided the machine learning device according to the above described first aspect; the robot performing a task in cooperation with the human; and a robot control unit controlling a motion of the robot, wherein the machine learning device learns a motion of the robot by analyzing a distribution of feature points or workpieces after the human and the robot have cooperated with each other and performed the task.

The robot system may further include a task intention recognition unit that receives outputs of a camera, a force sensor, a tactile sensor, a microphone, and an input device, and recognizes an intention regarding a task. The robot system may further include a voice recognition unit recognizing the voice of the human inputted from the microphone, wherein the task intention recognition unit corrects the motion of the robot based on an output of the voice recognition unit. The robot system may further include a question generation unit that generates a question to be asked of the human based on an analysis of intention regarding the task by the task intention recognition unit; and a speaker for delivering the question generated by the question generation unit to the human.

The microphone may receive an answer by the human to the question delivered by the speaker, and the voice recognition unit may recognize the answer by the human inputted by the microphone and outputs the answer to the task intention recognition unit. The state variable inputted to the state observation unit of the machine learning device may be an output of the task intention recognition unit, and wherein the task intention recognition unit may convert a positive reward based on an action of the human into a state variable set for the positive reward and output the state variable to the state observation unit, and may convert a negative reward based on an action of the human into a state variable set for the negative reward and output the state variable to the state observation unit. The robot control unit may stop the robot when the tactile sensor has detected a slight collision. The machine learning device may be set in such a way as to stop performing further learning of a motion that has been learned by a certain point in time.

According to a third aspect of the present invention, there is provided a machine learning method for learning a motion of a robot engaged in a task performed by a human and a robot in cooperation with each other, including observing a state variable indicating a state of the robot when the human and the robot cooperate with each other and perform a task; calculating a reward based on control data and the state variable for controlling the robot and on an action of the human; and updating an action value function for controlling a motion of the robot, based on the reward and the state variable.

BRIEF DESCRIPTION OF THE DRAWINGS

The present invention will be understood more clearly by referring to the following accompanying drawings.

FIG. 8 is a diagram for illustrating an example of a process in which the motion of the robot system illustrated in FIG. 7A and FIG. 7B is achieved by deep learning that employs a neural network.

DETAILED DESCRIPTION

Figure 1:
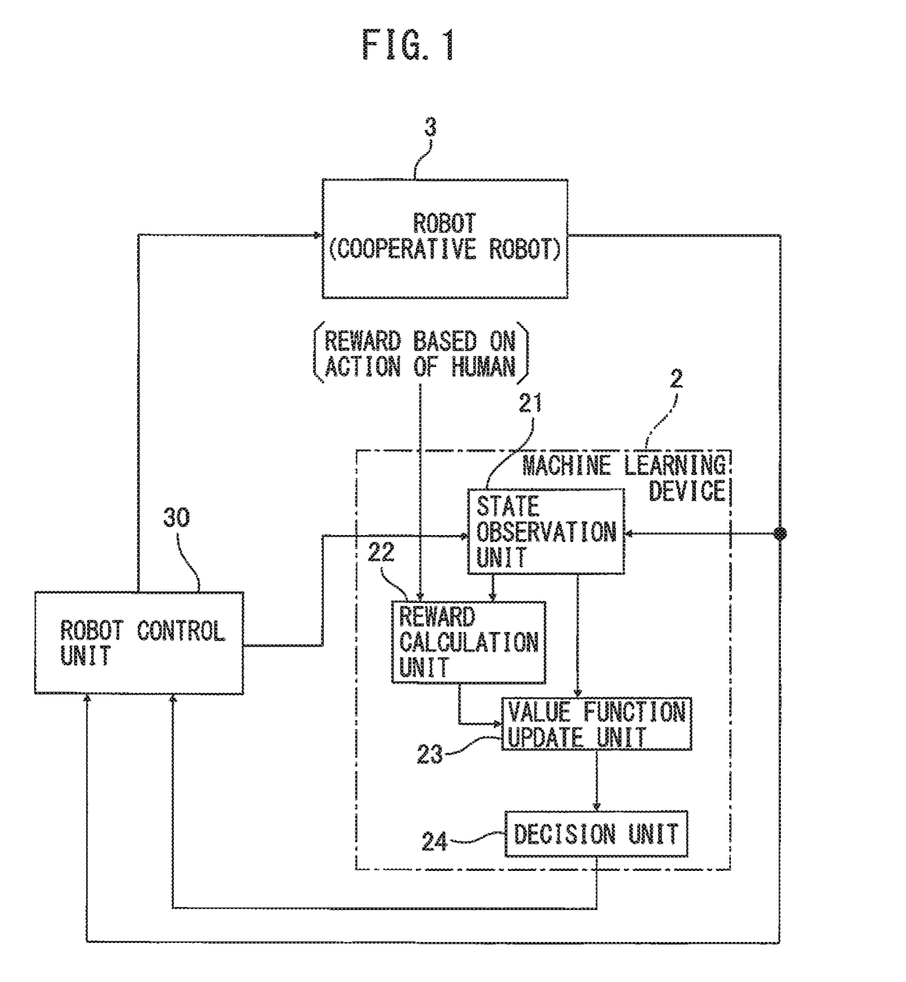
FIG. 1 is a block diagram illustrating a robot system according to an embodiment of the present invention.

Hereinafter, embodiments of a machine learning device, a robot system, and a machine learning method according to the present invention will be described in detail with reference to the attached drawings. FIG. 1 is a block diagram illustrating a robot system according to an embodiment of the present invention.

As illustrated in FIG. 1, a robot system according to the present embodiment serves for the learning of motions of a robot (cooperative robot) 3 engaged in a task performed by a human (worker 1) and a robot in cooperation with each other, and includes a robot 3, a robot control unit 30, and a machine learning device 2. The machine learning device 2 may be in a unitary configuration with the robot control unit 30, or may be provided separately.

As illustrated in FIG. 1, the machine learning device 2 learns, for example, motion commands of the robot 3, set in the robot control unit 30, and includes a state observation unit 21, a reward calculation unit 22, a value function update unit 23, and a decision unit 24. The state observation unit 21 observes the state of the robot 3, and the reward calculation unit 22 calculates a reward based on an output from the state observation unit 21 and an action of a human.

In other words, for example, control data of the robot from the robot control unit 30, an output from the state observation unit 21 (an state variable observed by the state observation unit 21), and a reward based on an action of a human are inputted to the reward calculation unit 22, and a reward is calculated. More specifically, for example, by means of a tactile sensor (41) provided on a part of the robot 3, a positive reward is set when the robot 3 is stroked whereas a negative reward is set when the robot 3 is hit, and a reward may be calculated by adding the reward based on the action of the human to the reward based on the control data and the state variable.

Alternatively, for example, by means of a microphone 42 provided on a part of or near the robot 3 or worn by the worker 1, a positive reward is set when the robot 3 is praised whereas a negative reward is set when the robot 3 is scolded, and a reward may be calculated by adding the reward based on the action of the human to the reward based on the control data and the state variable.

The value function update unit 23 updates, based on the reward calculated by the reward calculation unit 22, a value function relating to the motion command of the robot, calculated from the present state variable. The state variables observed by the state observation unit 21 include at least one of the outputs of a microphone (42), a camera (44), a force sensor (45), and a tactile sensor (41), as described below. The decision unit 24 determines a command data prescribing a motion of the robot 3, based on an output from the value function update unit 23.

Machine learning and a machine learning device (machine learning apparatus) will be described next. A machine learning device has a function of analyzing data sets inputted to the device and extracting useful rules, knowledge expression, judgement criteria, and the like contained in the data sets, and outputting the judgement result as well as learning the knowledge (machine learning). There are various techniques for machine learning, which may be roughly categorized into, for example, "supervised learning", "unsupervised learning", and "reinforcement learning". Furthermore, there is a technique called "deep learning" in which the machine learns to extract feature amounts on its own for implementing these techniques.

The machine learning device 2 described with reference to FIG. 1 employs "reinforcement learning", and the machine learning device 2 may be implemented by a general purpose computer or processor but, for example, GPGPU (General-Purpose computing on Graphics Processing Units) or a large-scale PC cluster may be employed for processing at even higher speed.

Other than "reinforcement learning", there are various types of machine learning and they will be described briefly here. First, in "supervised learning", a large number of data sets of certain inputs and results (labels) are fed into a machine learning device, which learns features contained in these data sets and inductively acquires a model (error model) for estimating results from the inputs, i.e., their relationships.

In "unsupervised learning", learning is performed in an apparatus in which input data alone is fed into a machine learning device in large amounts, and the device learns distributions of the input data and, for example, compresses, classifies, and shapes the input data without corresponding teacher output data being fed into the device. This allows, for example, the clustering of similar features contained in these data sets. The obtained result may be used to define certain criteria, and by allocating outputs in such a manner that the outputs are optimized according to the criteria, it is possible to predict the outputs. Further, there is what is called "semi-supervised learning", which exploits a problem setting that may be characterized as being halfway between "unsupervised learning" and "supervised learning". This is a case in which, for example, only a part of the data is provided in the form of data sets of inputs and outputs while the remaining data consists of inputs alone.

Next, "reinforcement learning" will be described in detail. First, a problem setting for "reinforcement learning" is provided as in the following.

The robot (i.e., the robot engaged in a task performed by a human and a robot in cooperation with each other (cooperative robot)) observes the state of the environment and determines its action.

The environment changes according to a certain rule and an action of the robot may affect the environment.

Every time an action is taken, a reward signal is returned.

The total (discounted) reward for the future is to be maximized.

Learning starts in a state in which the result of an action is totally unknown, or only partially known. In other words, the cooperative robot may obtain a result serving as data only after it has taken an action. In other words, an optimal action is sought by trial and error.

Learning can also be started from a good starting point by starting from an initial state of having learned in advance to imitate human motions (techniques such as "supervised learning" or "reverse reinforcement learning").

In "reinforcement learning", in addition to determination and classification, actions are learned to acquire a method for learning appropriate actions taking into consideration the interaction exerted on the environment by actions, i.e., learning to maximize the reward to be obtained in the future. In the following, Q-learning will be described as an example, but the present invention is not limited to Q-learning.

Q-learning is a method for leaning a value Q(s, a) of selecting an action a in an environmental state s. In other words, an action a having the highest value Q(s, a) in the state s is preferably selected as an optimal action. However, at first, the correct value of Q(s, a) is totally unknown with respect to a pair of a state s and an action a. The agent (the subject of an action) selects an action a among various options in a state s, and a reward is given in response to the selected action a. By this operation, the agent learns to select a better action, i.e., the correct value Q(s, a).

To maximize the sum of the rewards to be obtained in the future as a result of the actions, $Q(s, a)=E\ [\Sigma(\gamma-)\ r_t]$ is to be satisfied in the end. The expected value in this equation is taken in a state that has followed the optimal action, and the optimal action, which is unknown, is to be learned by a search. An updating equation of such a value Q(s, a) is given by, for example, equation 1.

$$Q(s_t, a_t) \leftarrow Q(s_t, a_t) + \alpha\left(r_{t+1} + \gamma\max_{a}Q(s_{t+1}, a) - Q(s_t, a_t)\right) \quad (1)$$

In equation 1, $s_t$ is the environmental state at time t and $a_t$ is the action at time t. By action $a_t$, the state changes to $s_{t+1}$. $r_{t+1}$ is the reward received as a result of the change in the state. The term with max is the product of the Q-value multiplied by $\gamma$ when an action a having the highest Q-value known in the state $s_{t+1}$ is selected. $\gamma$ is a parameter called discount rate, satisfying $0<\gamma\leq1$. $\alpha$ is a learning factor satisfying $0<\alpha\leq1$.

Equation 1 represents a method for updating the evaluation value Q ($s_t$, $a_t$) of action $a_t$ in state $s_t$, based on reward $r_{t+1}$ returned as a result of trial $a_t$. More specifically, when the sum of reward $r_{t+1}$ and the evaluation value Q ($s_{t+1}$, max $a_{t+1}$) of the best action max a in the state subsequent to state s upon action a is greater than the evaluation value Q ($s_t$, $a_t$) of action a in state s, Q ($s_t$, $a_t$) is increased; otherwise, Q ($s_t$, $a_t$) is reduced. In other words, the value of a particular action in a particular state is brought close to the reward immediately returned as a result and the value of the best action in the subsequent state upon the particular action.

Methods for representing Q (s, a) on a computer include a method of holding the numerical values of all state-action pairs (s, a) in the form of a table and a method of providing a function that approximates Q (s, a). With the latter method, above-mentioned equation 1 may be implemented by adjusting the parameter of an approximation function using a technique such as the stochastic gradient descent method. A neural network (to be described later) may be used as the approximation function.

Figure 2:
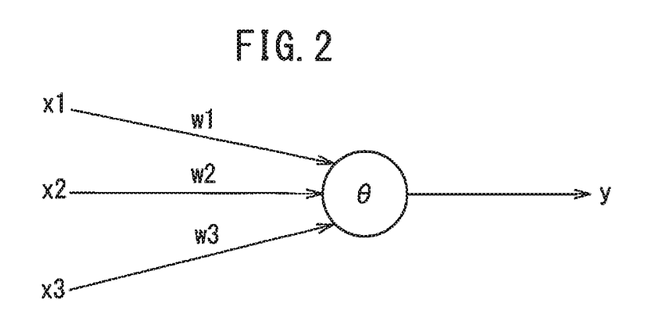
FIG. 2 is a schematic diagram of a neuron model.
Figure 3:
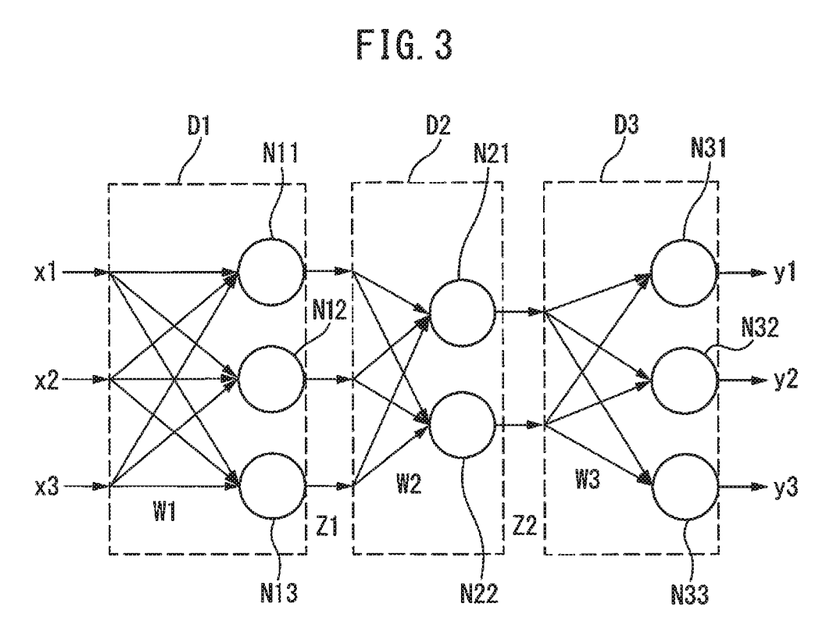
FIG. 3 is a schematic diagram of a neural network consisting of three layers, formed by combining neurons illustrated in FIG. 2.

A neural network may be used as an approximation algorithm for the value function in "reinforcement learning". FIG. 2 is a schematic diagram of a neuron model, and FIG. 3 is a schematic diagram of a neural network consisting of three layers, formed by combining neurons illustrated in FIG. 2. More specifically, the neural network is implemented by, for example, an arithmetic device and a memory in imitation of a neuron model as illustrated in, for example, FIG. 2.

As illustrated in FIG. 2, the neurons serve to output an output (result) y for a plurality of inputs x (inputs x1 to x3 as an example in FIG. 2). Each of the inputs x (x1, x2, x3) is multiplied by a corresponding weight w (w1, w2, w3). By this operation, the neurons output results y given by equation 2, where θ is a bias and $f_k$ is an activation function. Note that the inputs x, the results y, and the weights w are all vectors.

$$y = f_k(\Sigma_{i=1}^{n} x_i w_i - \theta) \qquad (2)$$

A three-layer neural network formed by combining neurons as illustrated in FIG. 2 will be described below with reference to FIG. 3. A plurality of inputs x (inputs x1 to x3 as an example herein) are inputted to the left side of the neural network and results y (results y1 to y3 as an example herein) are outputted from the right side of this network, as illustrated in FIG. 3. More specifically, the inputs x1, x2, and x3 are each inputted to three neurons N11 to N13 after being multiplied by corresponding weights. The weights used to multiply these inputs are collectively referred to as W1 herein.

The neurons N11 to N13 output z11 to z13, respectively. With reference to FIG. 3, z11 to z13 are collectively referred to as feature vectors Z1 and may be regarded as vectors obtained by extracting the feature amounts of input vectors. The feature vectors Z1 are feature vectors defined between the weights W1 and W2. Z11 to z13 are each inputted to two neurons N21 and N22 after being multiplied by corresponding weights. The weights used to multiply these feature vectors are collectively referred to as W2 herein.

The neurons N21 and N22 output z21 and z22, respectively. With reference to FIG. 3, z21 and z22 are collectively referred to as feature vectors Z2. The feature vectors Z2 are feature vectors defined between the weights W2 and W3. Z21 and z22 are each inputted to three neurons N31 to N33 after being multiplied by corresponding weights. The weights used to multiply these feature vectors are collectively referred to as W3 herein.

Lastly, the neurons N31 to N33 output results y1 to y3, respectively. The operation of the neural network includes a learning mode and a value prediction mode. For example, a weight W is learned in the learning mode using learning data sets, and a robot action is determined in the prediction mode using the parameter. Although "prediction" has been referred to above for the sake of convenience, a variety of tasks such as detection, classification, and inference are possible as a matter of course.

Data obtained by actually operating the robot in the prediction mode may be immediately learned and reflected on a subsequent action (online learning), or a group of data collected in advance may be used to perform collective learning and to subsequently execute the detection mode using the same parameters (batch learning). Alternatively, in an intermediate approach, the learning mode may be interposed every time a certain amount of data is accumulated.

The weights w1 to w3 may be learned by backpropagation. The information on errors enters from the right and flows to the left. Backpropagation is a technique used for adjusting (learning) each weight to reduce the difference between the output corresponding to the inputs x and the true output y (teacher). Such a neural network may have more than three layers (what is called deep learning). It is also possible to extract features of the input stepwise to automatically acquire an arithmetic device which returns a result from teacher data alone.

As described above, the machine learning device 2 according to the present embodiment includes a state observation unit 21, a reward calculation unit 22, a value function update unit 23, and a decision unit 24 to execute, for example, "reinforcement learning (Q-learning)". However, the machine learning method applied to the present invention is not limited to Q-learning and other methods may be applied as long as rewards may be calculated by adding a reward that is based on an action of a human. Machine learning (machine learning device 2) may be implemented by employing, for example, GPGPU or a large-scale PC cluster, as mentioned earlier.

Figure 4:
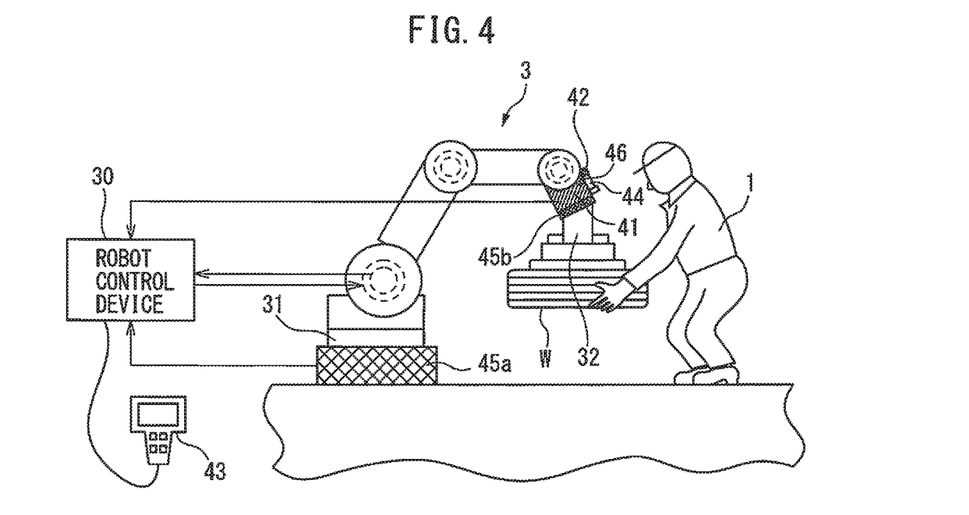
FIG. 4 is a schematic diagram of an example of a robot system according to the present embodiment.

FIG. 4 is a schematic diagram illustrating an example of the robot system according to the present embodiment, and illustrates an example in which a human 1 and a robot 3 cooperate with each other and transport a workpiece W. In FIG. 4, the reference numeral 1 denotes a human (worker), 3 demotes a robot (cooperative robot), 30 denotes a robot control unit, 31 denotes the base part of the robot 3, and 32 denotes the hand part of the robot 3. Further, the reference numeral 41 denotes a tactile sensor, 42 denotes a microphone, 43 denotes an input device (teach pendant), 44 denotes a camera, 45a and 45b denote force sensors, 46 denotes a speaker, and W denotes a workpiece. The machine learning device 2 described above with reference to FIG. 1 is provided, for example, in the robot control unit 30. Further, the input device 43 may be in the shape of a wrist watch and wearable by the human 1.

In an example of the robot system, as illustrated in FIG. 4, the microphone 42, the camera 44, and the speaker 46 are provided near the hand part 32 of the robot 3, the force sensor 45a is provided near the base part 31 of the robot 3, and the force sensor 45b is provided on the hand part 32 of the robot 3. At least one of the outputs of the microphone 42, the camera 44, the force sensor 45a, 45b, and the tactile sensor 41 serves as a state variable (state amount) to be inputted to the state observation unit 21 of the machine learning device 2 described above with reference to FIG. 1. The force sensors 45a, 45b detect force generated by a motion of the robot 3.

The tactile sensor 41 is provided near the hand part 32 of the robot 3, and a reward based on an action by the human 1 (a second reward) is given to the machine learning device 2 (the reward calculation unit 22) by means of this tactile sensor 41. More specifically, by means of the tactile sensor 41, a positive reward is set as a second reward when the human 1 has stroked the robot 3, and a negative reward is set when the human 1 has hit the robot 3, and this second reward is added to a reward based on, for example, the control data and the state variable (a first reward). The tactile sensor 41 may be provided, for example, in such a way as to cover the entire robot 3, and to ensure safety, the robot 3 may be configured to stop when tactile sensor 41 has detected a slight collision.

Alternatively, for example, by means of the microphone 42 provided on the hand part 32 of the robot 3, a positive reward is set when the human 1 has praised the robot 3 and a negative reward is set when the human 1 has scolded the robot 3, and this reward (a second reward) is added to the first reward based on the control data and the state variable. Note that the reward based on an action by the human 1 (the second reward) is not limited to a reward based on stroking and hitting using the tactile sensor 41 or praising and scolding using the microphone 42, and a second reward based on an action by the human 1 using various sensors or the like may be added to the above-described first reward.

Figure 5:
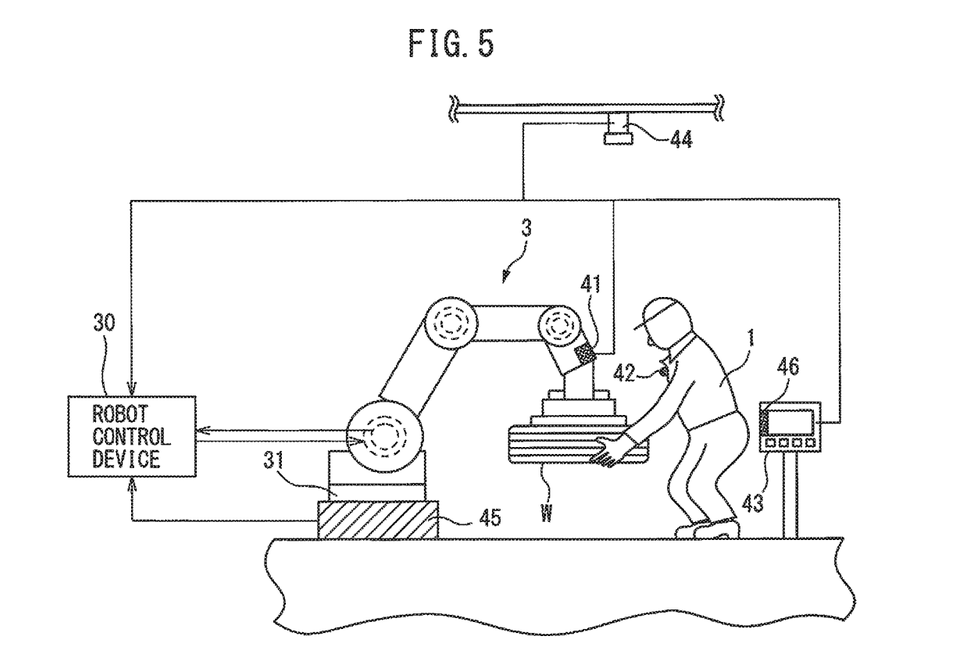
FIG. 5 is a schematic diagram of a modification example of the robot system illustrated in FIG. 4.

FIG. 5 is a schematic diagram of a modification example of the robot system illustrated in FIG. 4. As may be clearly seen by comparing FIG. 5 with FIG. 4, in the modification example illustrated in FIG. 5, the tactile sensor 41 is provided on a part of the robot 3 where it is easy for the human 1 to take an action such as stroking and hitting whereas the camera 44 is provided above the robot 3. The camera 44 has, for example, a zoom function and may take enlarged and reduced images.

The force sensor 45a is provided solely on the base part 31 of the robot 3, and the microphone 42 is worn by the human 1. Further, the input device 43 is a fixed device provided with the speaker 46. As has been described, the tactile sensor 41, the microphone 42, the input device 43, the camera 44, the force sensor 45, the speaker 46, and the like may be provided in various locations (for example, on peripheral devices).

Figure 6:
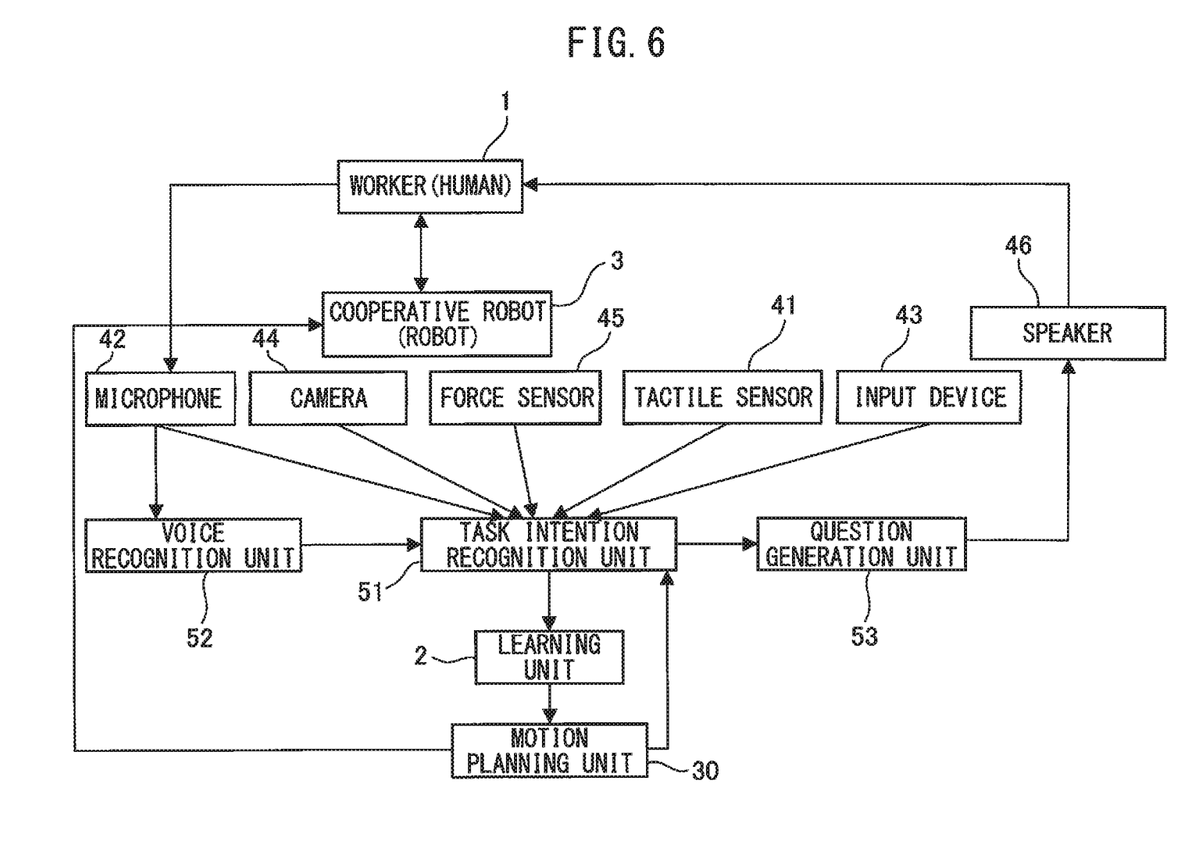
FIG. 6 is a block diagram for illustrating an example of a robot system according to the present embodiment.

FIG. 6 is a block diagram for illustrating an example of the robot system according to the present embodiment. As illustrated in FIG. 6, the robot system includes a cooperative robot 3 (a robot engaged in a task performed by a human and a robot in cooperation with each other), a robot control unit 30, a machine learning device 2, a task intention recognition unit 51, a voice recognition unit 52, and a question generation unit 53. The robot system also includes a tactile sensor 41, a microphone 42, an input device 43, a camera 44, a force sensor 45, a speaker 46, and the like. The machine learning device 2 may learn a motion of the robot 3 by, for example, analyzing the distribution of the feature points or the workpiece W after the human 1 and the robot 3 cooperated with each other to perform a task.

The task intention recognition unit 51 receives, for example, the outputs of the camera 44, the force sensor 45, the tactile sensor 41, the microphone 42, and the input device 43 to recognize the intention regarding the task. The voice recognition unit 52 recognizes the voice of the human 1 inputted to the microphone 42, and the task intention recognition unit 51 corrects the motion of the robot 3 based on the output of the voice recognition unit 52.

The question generation unit 53 generates a question to be asked of the human 1, for example, based on an analysis of intention regarding the task by the task intention recognition unit 51 and delivers the question to the human 1 by means of the speaker 46. The microphone 42 receives an answer made by the human 1 to the question delivered by the speaker 46, and the voice recognition unit 52 recognizes the answer by the human 1 inputted by means of the microphone 42 and outputs the answer to the task intention recognition unit 51.

In the example of the robot system illustrated in FIG. 6, a state variable inputted to the state observation unit 21 of the machine learning device 2 described above with reference to FIG. 1, for example, is given as an output from the task intention recognition unit 51. Here the task intention recognition unit 51 converts the reward based on an action of the human 1 (the second reward) into a state variable corresponding to the reward and outputs the state variable to the state observation unit 21. In other words, the task intention recognition unit 51 may convert a positive reward based on an action of the human 1 into a state variable set for the positive reward and output the state variable to the state observation unit 21, and convert a negative reward based on an action of the human 1 into a state variable set for the negative reward and output the state variable to the state observation unit 21.

In the present robot system, the machine learning device 2 may be set in such a way as to stop performing further learning of a motion that has been learned by a certain point in time. This applies to a situation in which the learning of the robot motions have been sufficiently performed and the robot is expected to perform tasks more stably by not making any more trials (learning), or similar situations. Further, the robot control unit 30 may stop the robot 3 when the tactile sensor 41 has detected a slight collision (for example, a collision different from the stroking and hitting by the human 1) for the sake of safety, as described above.

With reference to FIG. 6, an example of processing in the robot system according to the present embodiment will be described. For example, the voice of the human (worker) 1 is inputted to the voice recognition unit 52 by means of the microphone 42 and the content of the voice is analyzed. The content of the voice analyzed (recognized) by the voice recognition unit 52 is inputted to the task intention recognition unit 51. The task intention recognition unit 51 also receives signals from the tactile sensor 41, the microphone 42, the input device 43, the camera 44, and the force sensor 45, and analyzes the intention of the worker 1 regarding the task that he or she is performing, in view of these inputs together with the content of the utterance by the worker 1. The signals inputted to the task intention recognition unit 51 are not limited to those mentioned above and may be the outputs of various sensors and the like.

The task intention recognition unit 51 is capable of associating a voice (an output from the microphone 42) and a camera image (an output of the camera 44). Thus, when the worker 1 says "workpiece", for example, the workpiece in the image may be identified. This may be implemented, for example, by combining the technique developed by Google (registered trademark) for automatically generating a caption for an image with a conventional voice recognition technique.

The task intention recognition unit 51 is also provided with a simple vocabulary and, for example, the worker may make the robot (cooperative robot) 3 to make a motion for moving a workpiece slightly to the right by saying "move the workpiece slightly to the right". This type of operation is already in practical use as in the operation of Windows (registered trade mark) personal computers by voice recognition and the operation of mobile devices such as mobile phones by voice recognition.

Further, in the robot system according to the present embodiment, a voice (an output from the microphone 42) may be associated with a piece of force sensor information and for example, by saying "slightly weaker", the cooperative robot 3 may be controlled in such a way that the input to the force sensor 45 is weakened. More specifically, when the worker says "slightly weaker" when a force in x-direction is being applied, the cooperative robot 3 is controlled so as to weaken the force applied in x-direction, for example, to decrease the speed, acceleration, and force applied in x-direction.

The task intention recognition unit 51 stores the feature points distributions on the camera images captured before and after the performance of the task (for example, at the times when the worker says "start the work" and "end the work") and the cooperative robot 3 is controlled in such a way as to obtain a feature points distribution matching the state after the completion of the task. The feature points are the points with which the task may be appropriately represented, for example, by applying an autoencoder, and the feature points may be selected by the following procedure.

Figure 7A:
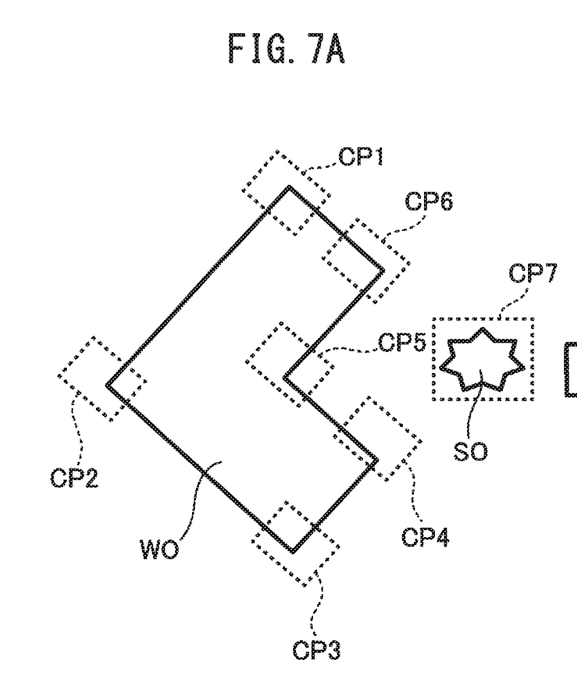
FIG. 7A and FIG. 7B are diagrams for illustrating an example of a motion of the robot system illustrated in FIG. 6.
Figure 7B:
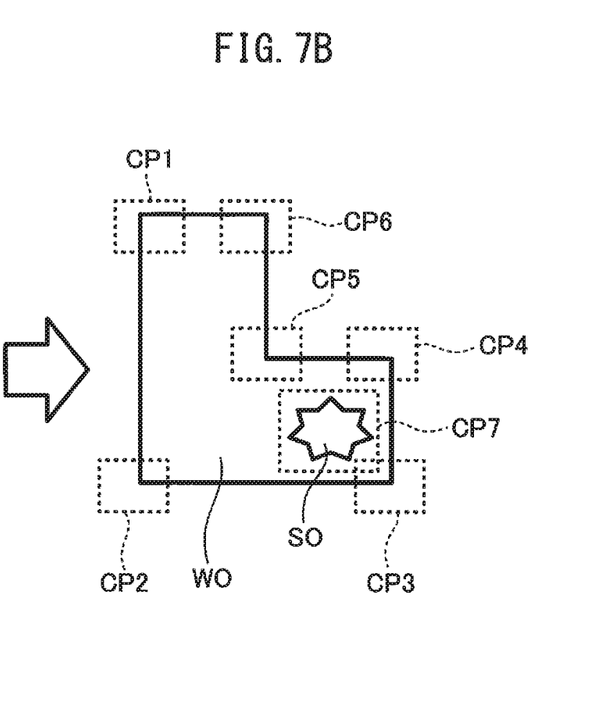

FIG. 7A and FIG. 7B are diagrams for illustrating an example of a motion of the robot system illustrated in FIG. 6, and for illustrating a procedure of selecting feature points. In other words, an L-shaped workpiece W0 and a star-shaped screw S0 separately placed as in FIG. 7A are moved by the motion of the robot (3) so that the star-shaped screw S0 is placed on an end portion of the L-shaped workpiece W0 as illustrated in FIG. 7B.

First, appropriate feature points (CP1 to CP7) are selected and their distributions and positional relationships are recorded before and after the performance of the task. Feature points may be set by a human but it will be convenient if they are automatically set by the robot. The automatically set feature points are set for characteristic portions CP1 to CP6 of the workpiece W0 and a portion CP7 that seems to be the component S0 or points showing changes between before and after the performance of the task. When a distribution of points after the performance of the task reveals a certain regularity, such points (feature points) serve as feature points well representing the task. When a distribution of points after the performance of the task reveals no regularity, these points are discarded as they do not represent the task. By performing this process every time a cooperative task is performed, correct feature points and the distribution of the feature points after the performance of the task are applied to machine learning. In some cases a certain fluctuation in the distributions of feature points is allowed but it may be dealt with by applying, for example, deep learning with a neural network to perform learning with flexibility.

For example, in the task of placing the star-shaped screw S0 on an end portion of the L-shaped workpiece W0 as illustrated in FIG. 7A and FIG. 7B, for example, the feature points (the portions framed in dotted line) CP1 to CP7 are selected, the distribution of the feature points after the completion of the task is stored in memory. The objects (W0, S0) are then moved in such a way that the feature points distribution of the object matches the feature points distribution representing the state after the completion of the task, thereby completing the task.

Figure 8:
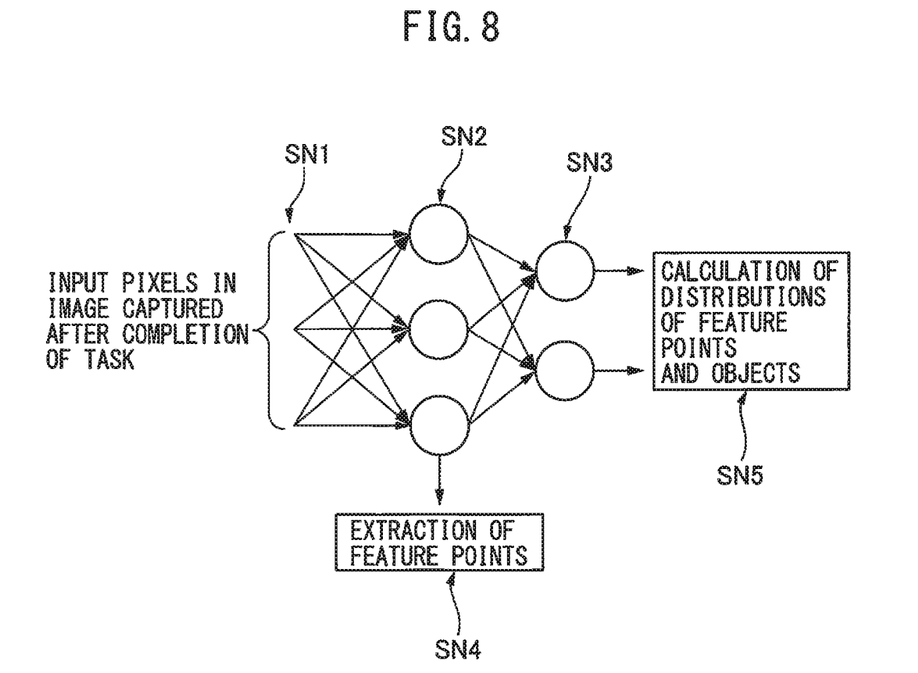

FIG. 8 is a diagram for illustrating an example of a process in which the motion of the robot system illustrated in FIG. 7A and FIG. 7B is achieved by deep learning that employs a neural network. In FIG. 8, first, as indicated by SN1, for example, pixels in the image captured after the completion of the task are inputted to each neuron (neural network), and as indicated by SN2, the feature points (CP1 to CP7) and the objects (W0, S0) in the image are recognized by the neurons. Further, as indicated by SN3, distribution regularities of the feature points and the objects are learned by the neurons and then the intention regarding the task may be analyzed. Note that the layers of the neural network are not limited to the three layers consisting of an input layer, an intermediate layer, and an output layer, and it is needless to say that, for example, the intermediate layer may be formed with a plurality of layers.

Next, when the task is to be performed, the image before the performance of the task is inputted to the neurons for recognizing the feature points and the objects in the image (extraction of feature points) as indicated by SN4, in similar processes to those indicated by SN1 to SN3, and then, as indicated by SN5, the distributions of the feature points and the objects after the completion of the task are calculated by the processing by the neurons indicated by SN2 and SN3. The robot 3 is then controlled to move the objects (W0, S0) in such a way that the distributions of the feature points and the objects match the calculated distributions, thereby completing the task.

Description continues with reference to the above-described FIG. 6. As illustrated in FIG. 6, when there are points on which clarification or confirmation is desired at the time of analysis by the task intention recognition unit 51, for example, such points are conveyed to the question generation unit 53, and questions generated in the question generation unit 53 are delivered to the worker (human) 1 by means of the speaker 46. More specifically, when the worker 1 says "the workpiece more to the right", the cooperative robot 3 (robot system) can, for example, move the workpiece slightly to the right and asks the worker 1, "Is this the right position?"

The worker answers the question, which he or she has received by means of the speaker 46, and the content of the answer of the worker 1 is analyzed by means of the microphone 42 and the voice recognition unit 52 and fed back to the task intention recognition unit 51, which analyzes the intention of the worker regarding the task. The task intention recognition unit 51 outputs the result of the analysis (including, for example, an output of a reward based on an action of the worker 1 (a second reward) converted to a state variable corresponding to the reward, as described above) to the machine learning device 2. The processing in the machine learning device 2 has been described in detail above and will not be described further, but the output of the machine learning device 2 is inputted to the robot control unit 30 to control the cooperative robot 3 and, for example, used for controlling the cooperative robot 3 in later performances according to the acquired intention regarding the task.

The present robot tries to improve the way it performs the task by changing little by little its motions and movement speed even in the course of the cooperative work. As described above, a reward by the worker 1 (a second reward) may be a positive or negative award in response to an improvement in performance of the task, the award being set by his or her action of stroking or hitting by means of the tactile sensor 41 or praising or scolding by means of the microphone 42. When the worker 1 has hit the cooperative robot 3 by means of the tactile sensor 41 (setting a negative reward or giving a punishment), for example, the cooperative robot 3 may improve its motions, for example, by avoiding in later performances the type of directional change that the cooperative robot had made by its motion immediately before the punishment was given.

Further, when the cooperative robot 3 made a modification in its motion so as to move in a certain section a little faster and then was hit by the worker (a punishment was given), the cooperative robot may improve its motions by avoiding making modification to move faster in that section in later performances. When the robot system (cooperative robot 3) does not understand why the punishment was given because, for example, it has operated only a small number of times, the robot system (the question generation unit 53) may ask a question of the worker 1, and if told to move more slowly, the cooperative robot 3 will be controlled in such a way as to move more slowly next time.

As described above, the robot system (cooperative robot 3) according to the present embodiment may perform not only machine learning of the motions based on state variables but also correct (improve) the motions of the cooperative robot 3 based on an action by the human (worker) 1. Furthermore, conversation by the task intention recognition unit 51 (the voice recognition unit 52, the question generation unit 53) with the worker 1 enables further improvement in the motions of the cooperative robot 3. Questions generated by the question generation unit 53 for the conversation between the cooperative robot 3 and the worker 1 may include not only questions based on the cooperative task performed with the worker such as "Which workpiece should I pick up?" or "Where should I put the workpiece?" which may be asked, for example, when a plurality of workpieces are found, but may also include questions on its own actions to be asked of the worker 1, such as "Is this the right workpiece?" or "Is this the right place?" which may be asked, for example, when the cooperative robot has not completed sufficient amount of learning and is uncertain about its actions.

As described above in detail, an embodiment of the machine learning device, a robot system, and a machine learning method of the present invention enables the collection of learning data during the performance of a cooperative task, and thereby improves the motions of a robot engaged in a task performed by a human and a robot in cooperation with each other. Further, the embodiment of the machine learning device, a robot system, and a machine learning method according to the present invention improves cooperative motions during a task performed by a human and a robot in cooperation with each other, by utilizing various sensor information, through conversation with the human, and by other means. In certain instances the robot learns to perform a task, eliminating the need of working in cooperation with the human.

The embodiments of a machine learning device, a robot system, and a machine learning method according to the present invention have an advantageous effect of further improving the motions of a robot engaged in a task performed by a human and a robot in cooperation with each other. In addition, a machine learning device, a robot system, and a machine learning method according to the present invention also have an advantageous effect of improving cooperative motions during a task performed by a human and a robot in cooperation with each other, by utilizing various sensor information, through conversation with the human, and by other means.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A robot system, comprising:
   a robot configured to perform a task in cooperation with a human;
   a robot control unit controlling a motion of the robot;
   a machine learning device for learning the motion of the robot engaged in the task performed by the human and the robot in cooperation with each other, the machine learning device comprising:
   a state observation unit configured to observe a state variable indicating a state of the robot when the human and the robot cooperate with each other and perform the task;
   a reward calculation unit configured to calculate a reward based
      (1) on control data and the state variable for controlling the robot, and
      (2) on a reaction of the human to the robot in response to the motion of the robot when the task is performed by the human and the robot cooperating with each other; and
   a value function update unit configured to update an action value function for controlling the motion of the robot, based on the reward and the state variable,
   wherein the machine learning device is configured to learn the motion of the robot by analyzing a distribution of feature points or workpieces after the human and the robot have cooperated with each other and performed the task; and
   a task intention recognition unit configured to receive outputs of at least one of a camera, a force sensor, a tactile sensor, a microphone, or an input device, and recognize an intention regarding the task,
   wherein the state variable inputted to the state observation unit of the machine learning device is an output of the task intention recognition unit,
   wherein the task intention recognition unit is configured to
      convert a positive reward based on the reaction of the human into a state variable set for the positive reward and output the state variable to the state observation unit, and
      convert a negative reward based on the reaction of the human into a state variable set for the negative reward and output the state variable to the state observation unit, and
   wherein the reaction of the human is received by at least one of the camera, the force sensor, the tactile sensor, the microphone, or the input device, during a time when the task is being performed by the human and the robot cooperating with each other.

2. The robot system according to claim 1, wherein the reward calculation unit is configured to calculate the reward by adding a second reward based on the reaction of the human to a first reward based on the control data and the state variable.

3. The robot system according to claim 2, wherein for the second reward,
   a positive reward is set when the robot is stroked and a negative reward is set when the robot is hit, by a tactile sensor provided for the robot, or
   a positive reward is set when the robot is praised and a negative reward is set when the robot is scolded, by a microphone provided on a part of or near the robot or worn by the human.

4. The robot system according to claim 1, further comprising:
   a decision unit configured to determine command data prescribing the motion of the robot, based on an output of the value function update unit.

5. The robot system according to claim 1, wherein the state variable includes at least one of outputs of a camera, a force sensor, a microphone and a tactile sensor.

6. The robot system according to claim 5, wherein
   the camera is provided directly onto the robot or in an area around the robot,
   the force sensor is provided on at least one of a base part, or a hand part of the robot or a peripheral device, or
   the tactile sensor is provided on at least a part of the robot or on a peripheral device.

7. The robot system according to claim 1, further comprising:
   a voice recognition unit configured to recognize the voice of the human inputted from the microphone,
   wherein the task intention recognition unit is configured to correct the motion of the robot based on an output of the voice recognition unit.

8. The robot system according to claim 7, further comprising:
- a question generation unit configured to generate a question to be asked of the human based on an analysis of intention regarding the task by the task intention recognition unit; and
- a speaker for delivering the question generated by the question generation unit to the human.

9. The robot system according to claim 8, wherein
the microphone is configured to receive an answer by the human to the question delivered by the speaker, and
the voice recognition unit is configured to recognize the answer by the human inputted by the microphone and output the answer to the task intention recognition unit.

10. The robot system according to claim 1, wherein the robot control unit is configured to stop the robot in response to the tactile sensor detecting a collision different from a stroking or hitting by the human.

11. The robot system according to claim 1, wherein the machine learning device is configured to stop performing further learning of the motion that has been learned by a certain point in time.

12. A machine learning method for learning a motion of a robot engaged in a task performed by a human and the robot in cooperation with each other, the machine learning method comprising:
- observing a state variable indicating a state of the robot when the human and the robot cooperate with each other and perform a task;
- calculating a reward based
  (1) on control data and the state variable for controlling the robot, and
  (2) on a reaction of the human to the robot in response to the motion of the robot when the task is performed by the human and the robot cooperating with each other; and
- updating an action value function for controlling a motion of the robot, based on the reward and the state variable,
the machine learning method further comprising:
- learning the motion of the robot by analyzing a distribution of feature points or workpieces after the human and the robot have cooperated with each other and performed the task;
- during a time when the task is being performed by the human and the robot cooperating with each other, receiving the reaction of the human by at least one or a camera, a force sensor, a tactile sensor, a microphone, or an input device, to recognize an intention regarding the task;
- converting a positive reward based on the reaction of the human into a state variable set for the positive reward and outputting the state variable; and
- converting a negative reward based on the reaction of the human into a state variable set for the negative reward and outputting the state variable.

\* \* \* \* \*